United States Patent [19]
Wilson

[11] Patent Number: 6,049,066
[45] Date of Patent: Apr. 11, 2000

[54] CONCENTRIC AIR DELIVERY AND RETURN OVEN

[76] Inventor: W. Robert Wilson, 6043 Del Norte, Dallas, Tex. 75225

[21] Appl. No.: 09/276,927

[22] Filed: Mar. 26, 1999

[51] Int. Cl.7 ...................................................... A21B 1/00
[52] U.S. Cl. ........................ 219/400; 219/388; 126/21 A; 34/223; 34/232
[58] Field of Search ................................... 219/400, 388; 126/21 A; 34/212, 213, 214, 216, 223, 232, 233

[56] References Cited

U.S. PATENT DOCUMENTS

| | | | |
|---|---|---|---|
| 5,131,841 | 7/1992 | Smith et al. | 432/59 |
| 5,205,274 | 4/1993 | Smith et al. | 126/21 |
| 5,671,660 | 9/1997 | Moshonas | 99/443 |
| 5,717,192 | 2/1998 | Dobie et al. | 219/681 |

Primary Examiner—Teresa Walberg
Assistant Examiner—Shawntina Fuqua
Attorney, Agent, or Firm—Crutsinger & Booth

[57] ABSTRACT

An impingement heat transfer device for transferring heat between a stream of temperature controlled air and a product wherein an air supply duct and an air return duct have a common wall. A tube has one end communicating with the inside of the air supply duct and another end extending through an opening in the air return duct. Air is circulated to reduce pressure in the air return duct and increase pressure in the air supply duct such that a stream of air flows through and out of the tube and spent air is drawn through the opening encircling the tube into the air return duct.

18 Claims, 3 Drawing Sheets

CONCENTRIC AIR DELIVERY AND RETURN OVEN

TECHNICAL FIELD

The invention disclosed herein relates to impingement heat transfer apparatus for preparing food.

BACKGROUND OF INVENTION

Pizzas and other fast food products are generally cooked in ovens to bake the crust and to bake, heat, and melt the toppings. One style of pizza oven is a deck oven that uses radiant and conductive heat for cooking. Typically, the required baking time in a deck oven would be in a range between about 15 and 25 minutes.

An impingement oven uses mostly convection to heat the pizza, as well as some heat of conduction. The newer pizza ovens typically are impingement ovens which move the pizzas through the oven on conveyors while others are equipped with rotating turntables for moving the pizza relative to air streams that impinge the pizza.

An impingement oven is described in U.S. Pat. No. 4,679,542 to Don Paul Smith. These ovens, which are a special type of forced convection oven using columnated heated air to impact the pizza, have increased heat transfer capabilities and therefore have reduced the bake time of pizza and other foods significantly.

Impingement ovens have achieved wide acceptance among pizza restaurants, and pizza delivery systems, especially those which deal with high volume and fast service. The typical bake time for the commercially available impingement ovens is in the range of about 5 to 9 minutes. However, by using partially pre-baked crust in an impingement oven at a relatively high temperature, the final cooking time may be reduced to a little over one minute.

Pat. No. 4,965,435 discloses a jet impingement oven in which spent air from jets formed by tubes is drawn toward the front wall of the oven. Patent No. 5,310,978 discloses an oven in which spent is drawn toward opposite sides of the oven for returning the spent air to a fan. U. S. Pat. No. 5,510,601 discloses an air impingement oven wherein air is delivered by a fan into hollow fingers for forming columns of heated air that are projected through tubes. After the columns of air impinge against the surface of the food product, the spent air is drawn toward the back wall of the oven.

In each of the patents referred to above, after the jets impinge upon the surface of the product, the spent air is drawn around or through jets of air that have not yet impinged against the surface of the product. This tends to disrupt or "wash out" the collimated jets of air.

SUMMARY OF INVENTION

The impingement heat transfer device disclosed herein transfers heat between a stream of temperature controlled air and a product wherein an air supply duct and an air return duct have a common wall. A pattern of tubes, where each tube has one end communicating with the inside of the air supply duct and another end extending through an opening in the air return duct. Air is circulated by a fan to reduce pressure in the air return duct and increase pressure in the air supply duct such that a stream of air flows through and out of the tubes and spent air is drawn through the opening encircling each tube into the air return duct.

A preferred method of transferring heat between a stream of temperature controlled air and a product in an impingement heat transfer device includes the step of directing a plurality of streams of air to impinge against a plurality of splash areas spaced over the surface of the product such that heat is transferred between each stream of air and the splash area against which it impinges. Each stream, after impinging on the product, is diffused transversely away from the stream to form a volume of spent air.

Each volume of spent air is drawn transversely toward the stream of air that was diffused to form the spent volume such that spent air from each of the plurality of streams does not influence the flow of air toward the product in any other stream.

Each volume of spent air is collected adjacent the stream of air that was diffused to form the spent volume.

Imparting relative movement between the product and the plurality of streams, wherein the splash areas move across the surface of the product, causes heat to be transferred substantially uniformly over the surface of the product.

Steps of directing a plurality of streams of air to impinge against a plurality of splash areas spaced over the surface of the product and for drawing each volume of spent air transversely toward the stream of air that was diffused to form the spent volume are preferably accomplished by providing an air supply duct and an air return duct having a common wall wherein a tube has one end communicating with the inside of the air supply duct and another end extending through an opening in the air return duct. The opening in the air return duct has an inside diameter and the tube has an outside diameter, the outside diameter of the tube being less than the inside diameter of the opening in the air return duct to form an inlet into the air return duct encircling the tube. A stream of air flows through and out of the tube and spent air is drawn through the opening encircling the tube into the air return duct.

This process produces a plurality of areas of low pressure, at least one of the areas of low pressure being adjacent to and encircling each of the plurality of tubes and spaced from the outlet of each tube wherein spent air is drawn toward the area of low pressure encircling the tube after the stream impinges the product and before the spent air flows to influence the flow of air toward the product in any other stream. Air from each tube has an independent air return path and adjacent air streams do not influence air flow from another tube. Air flow from each tube is balanced and does not disturb the integrity of other air streams.

An impingement heat transfer device for accomplishing the transfer of heat between a stream of temperature controlled air and a food product generally includes a cabinet and fan or blower for directing a plurality of streams of air to impinge against a plurality of splash areas spaced over the surface of the product such that heat is transferred between each stream of air and the splash area against which it impinges. Each stream is diffused transversely away from the stream to form a volume of spent air.

Spent air collectors are provided in the cabinet for drawing each volume of spent air transversely relative to the direction of flow of the stream toward the stream of air that was diffused to form the spent volume. Thus, spent air from each of the plurality of streams does not influence the flow of air toward the product in any other stream and each volume of spent air is collected adjacent the stream of air that was diffused to form the spent volume. Spent air from each stream of air is concentrically balanced with the volume of air in the original air stream.

The product may be carried on a conveyor or turntable for imparting relative movement between the product and the plurality of streams or in the alternative the apparatus forming the streams may move to impart movement of the splash areas across the surface of the product such that heat is transferred substantially uniformly over the surface of the product.

Fingers in the cabinet form and direct a plurality of streams of air to impinge against a plurality of splash areas spaced over the surface of the product such that heat is transferred between each stream of air and the splash area against which it impinges.

The fingers serve the dual function of forming collectors between adjacent streams for collecting spent air such that spent air from each of the plurality of streams does not influence the flow of air toward the product in any other stream and for collecting each volume of spent air adjacent the stream of air that was diffused to form the spent volume.

Each finger preferably includes an air return duct having a wall having a plurality of inlet openings with inside diameters; a tube having an outside diameter and having a tubular passage extending through each of said inlet openings in the air return duct, wherein the OD of the tube is less than the ID of the inlet opening and the outlet is spaced from the wall of the air return duct. Pressure in the air return duct is maintained less than pressure outside the air return duct for producing areas of low pressure encircling each of the plurality of tubular passages and spaced from the outlets wherein spent air is drawn toward the inlet openings which encircle the tubular passage.

DESCRIPTION OF THE DRAWINGS

Drawings of a preferred embodiment of the invention are annexed hereto so that the invention may be better and more fully understood, in which.

Numeral references are employed to designate like parts throughout the various figures of the drawings.

DESCRIPTION OF A PREFERRED EMBODIMENT

Figure 1:
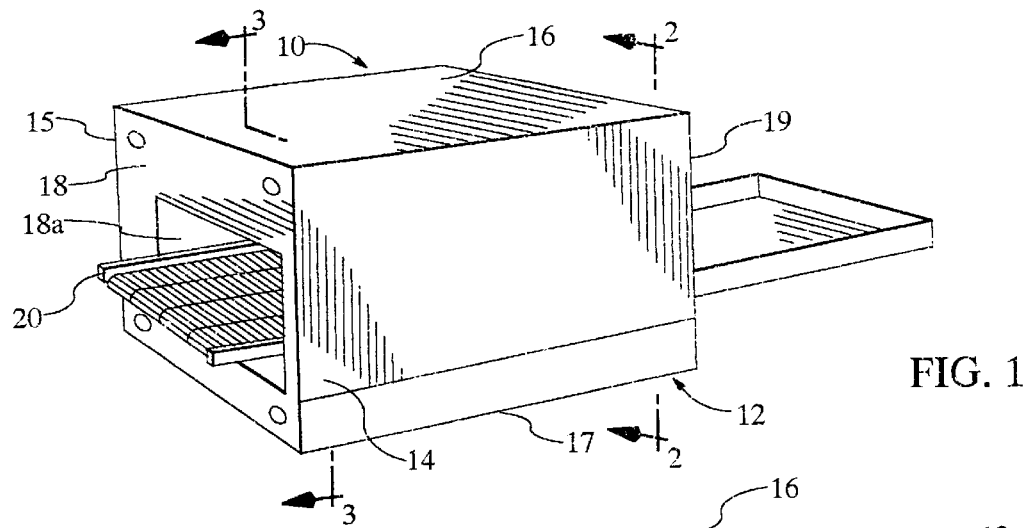
FIG. 1 is a perspective view of a conveyorized oven.
Figure 2:
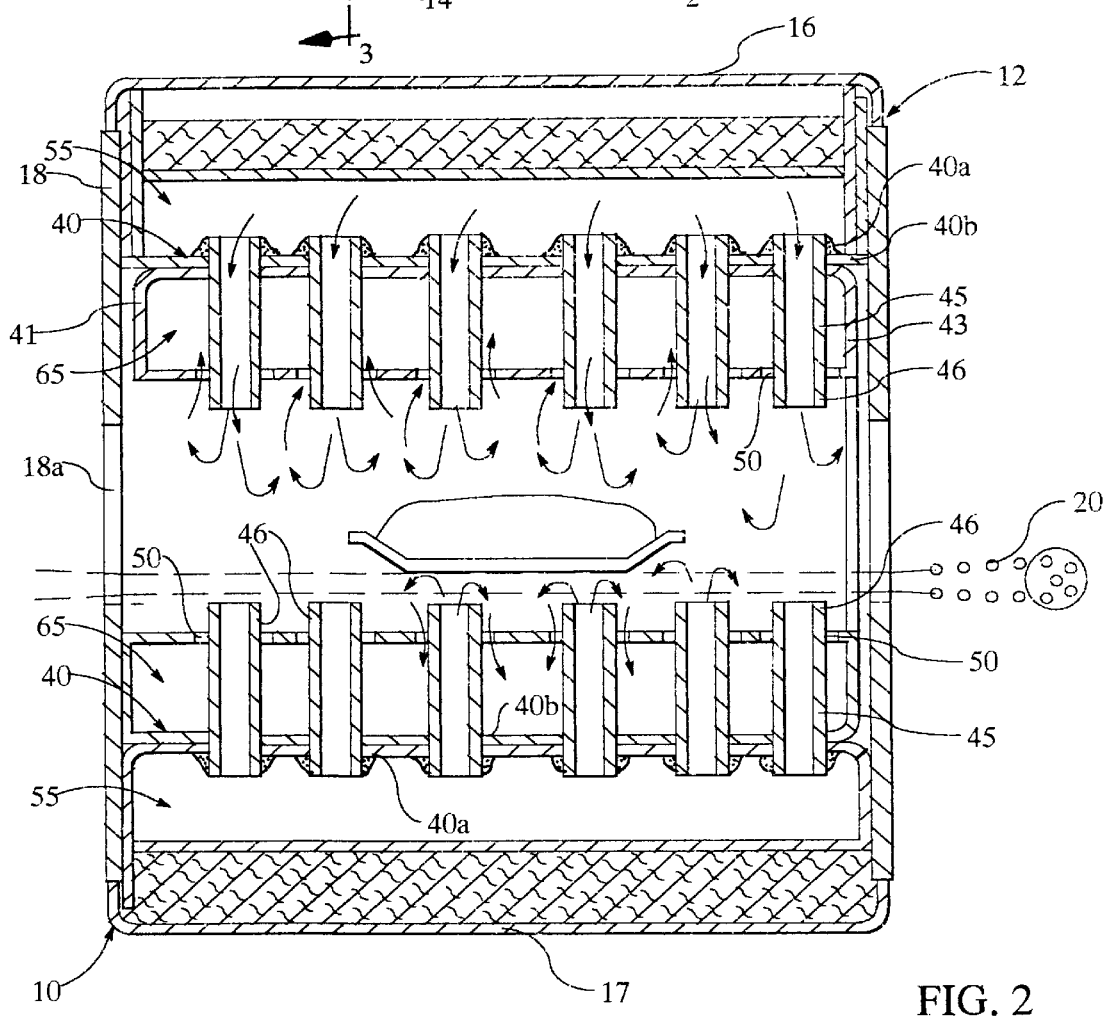
FIG. 2 is a cross-sectional view taken substantially along line 2—2 of FIG. 1.

Referring to FIG. 1 of the drawing, the numeral 10 generally designates a conveyorized impingement oven which includes a cabinet 12 and a conveyor 20. Cabinet 12 has a front wall 14, rear wall 15, top wall 16, bottom wall 17 and end walls 18 and 19. As illustrated in FIGS. 1 and 2, end wall 18 has an entrance opening 18a and rear wall 19 has an exit opening 19a through which conveyor 20 extends for moving food products through an interior compartment 30 inside cabinet 12.

Conveyor 20 is preferably formed by spaced bars connected by chains driven by a motor for continuous, intermittent or reciprocating movement of a pan P through chamber 30.

For a description of details for a cabinet of the general type designated by numeral 12 in FIG. 1 of the drawing, references may be made to Kaminski et al U.S. Pat. No. 4,753,215; Henke U.S. Pat. No. 4,881,519 and Smith et al U.S. Pat. No. 5,131,841. Each of these patents disclose conveyorized impingement ovens.

Referring to FIGS. 1 and 2 of the drawing, upper finger 32 and lower finger 34 are positioned in cabinet 12 above and below conveyor 20. Fingers 32 and 34 are of substantially identical construction and each is configured for concentric balancing of air delivered by forming streams which impinge upon the surface of the food product carried on conveyor 20 and a volume of spent air which results from impingement of each air stream against the food product.

Each finger 32 and 34 has an outer wall 42 and an inner wall 44 spaced on opposite sides of a partition wall 40. In the embodiment illustrated in FIGS. 3 and 4, partition wall 40 is formed of two plates 40a and 40b to facilitate cleaning. Partition wall 40 has an array of openings formed therein through which hollow tubes 45 extend with ends of tubes 45 being secured to partition wall 40. Inner wall 44 of each finger 32 and 34 has an array of openings 50 through which ends 46 of tubes 45 extend.

Figure 3:
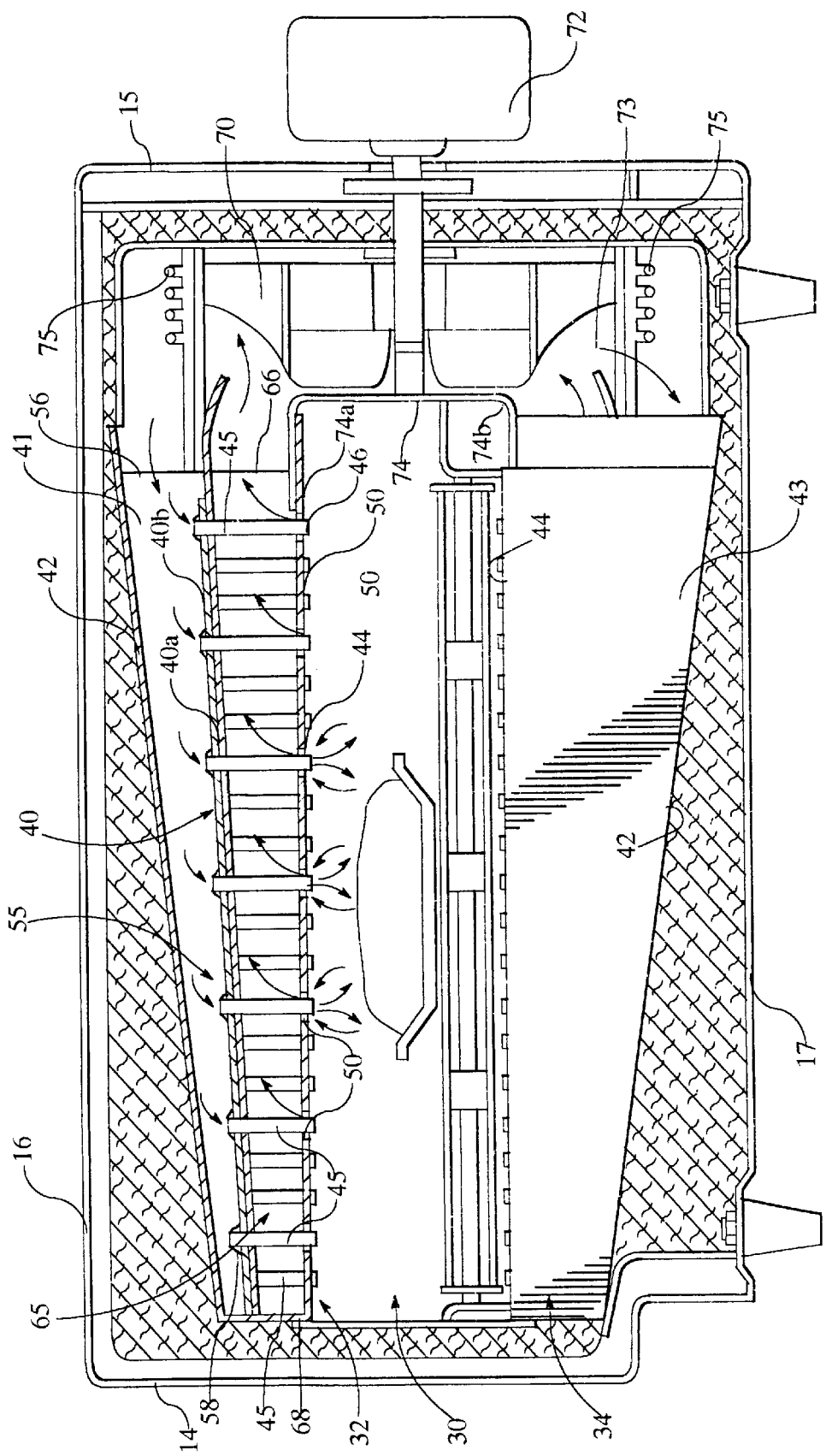
FIG. 3 is a cross-sectional view taken substantially along line 3—3 of FIG. 1.

As best illustrated in FIG. 2 of the drawing, upper finger 32 and lower finger 34 each has end walls 41 and 43 welded or otherwise secured to edges of partition wall 40, outer wall 42 and inner wall 44 for forming a tapered air delivery duct 55 on one side of partition wall 40 and an air return duct 65 on the opposite side of partition wall 40. As best illustrated in FIG. 3 of the drawing, air delivery duct 55 preferably has a tapered cross-section extending from an entrance end 56 toward an outer end 58. Return duct 65 preferably has a tapered cross-section which increases in area from outer end 68 toward the outlet end 66.

A fan blade 70, driven by an electric motor 72 is configured for drawing air from return duct 65 and for delivering air over an electric heating element 75 into air delivery duct 55.

Fan 70 is mounted in a plenum 73 bounded by rear wall 15, top wall 16, bottom wall 17, end walls 18 and 19 and plenum wall 74. Plenum wall 74 is preferably formed with upper and lower flanges 74a and 74b for supporting inner walls 44 of upper finger 32 and lower finger 34.

Figure 5:
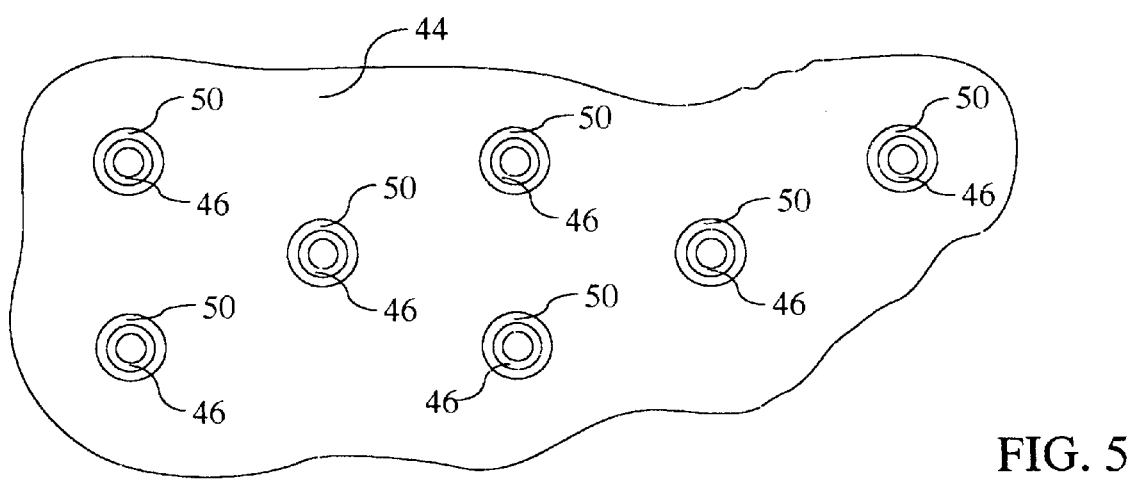
FIG. 5 is a diagrammatic view of an array of overlapping rows and columns of tubes and air return passages.

Tubes 45 are preferably arranged in overlapping rows and columns, as best illustrated in FIG. 5, which impinge against an array of splash areas directly below each tube 45 such that heat delivered by air streams formed by tubes 45 provide substantially uniform coverage over a pan surface moving through compartment 30.

Figure 4:
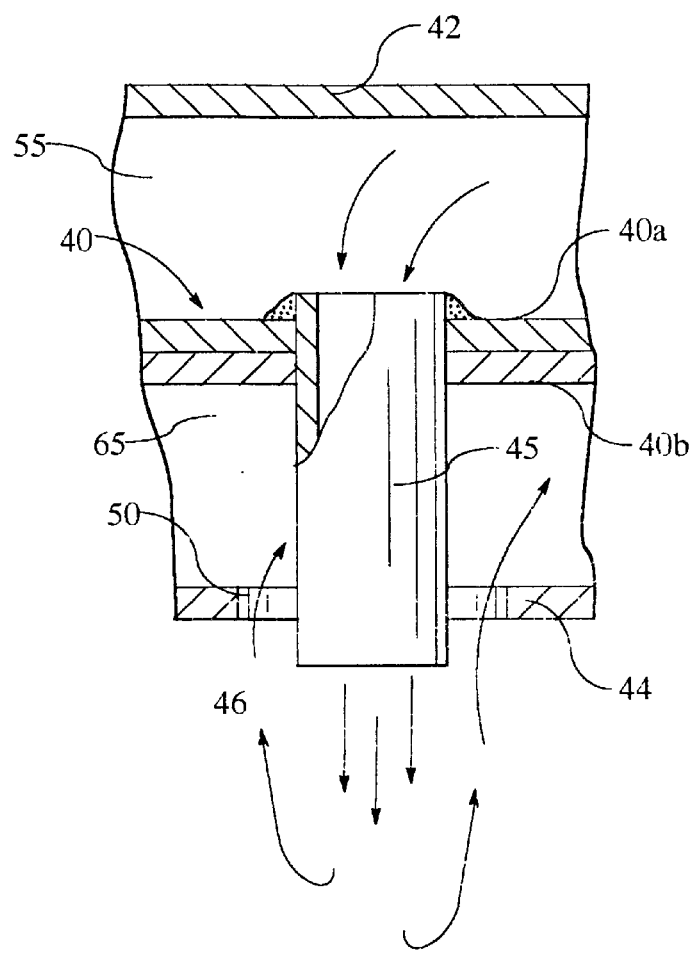
FIG. 4 is an enlarged fragmentary cross-sectional view illustrating the relationship of an air delivery tube and an air return passage encircling the tube.

As illustrated in FIGS. 2 and 4, lower ends 46 of tubes 45 extend below the lower surface of inner wall 44 a distance sufficient to permit return of spent air toward circular openings 50 without interfering with the stream or columnated jet of air formed by each tube 45.

The distance the end 46 of each tube extends from inner wall 44 of upper and lower fingers 32 and 34 will vary depending upon the outside diameter of tube 45 and the inside diameter of air return passages 50 which is dictated primarily by the volume of air to be delivered by fan 70. However, it should be readily apparent that the air from each air stream is collected by a concentric passage 50 encircling tube 45 such that spent air from one stream does not influence air flowing from an adjacent tube 45 before it impinges against the surface of the food product. The stream of air formed by each tube 45 has an independent air return path encircling tube 45.

Tubes 45 are arranged for directing a plurality of streams of air or other temperature controlled fluid from delivery duct 55 to impinge against a plurality of splash areas spaced over the surface of the product carried in pan P such that heat is transferred between each stream of fluid and the splash area against which it impinges. Air in each stream is diffused transversely away from the stream to form a volume of spent air which is drawn toward opening 50 encircling tube 45 that formed the stream. Since each volume of spent fluid is collected adjacent the stream that was diffused, the volume of air from each stream is concentrically balanced with the return air drawn through opening 50.

The concentric balancing of air flow from upper and lower tubes 45 eliminates the tendency of air streams to be washed out by air returning to fan 70. It should also be readily apparent that the tendency of air to flow through the inlet and outlet openings 18a and 19a adjacent opposite ends of cabinet 12 is minimized and that movement of air within the cabinet 12, along the interior surfaces of the outside walls, will be minimized with a favorable effect on energy efficiency.

The term "heat transfer" as used herein is intended to include heating or cooling. It should be readily apparent that heating element 75 may be replaced by a cooling coil without departing from the basic concept of the invention.

Terms such as "left," "right," "clockwise," "counter-clockwise," "horizontal," "vertical," "up," and "down" when used in reference to the drawings, generally refer to orientation of the parts in the illustrated embodiment and not necessarily during use. These terms used herein are meant only to refer to relative positions and/or orientations, for convenience, and are not to be understood to be in any manner otherwise limiting. While the present invention has been illustrated and described in reference to a preferred embodiment, it is to be understood that various other embodiments, adaptations and modifications may be made within the spirit and scope of the invention.

What is claimed is:

1. A method of transferring heat between a stream of temperature controlled fluid and a product in an impingement heat transfer device comprising the steps of:

directing a plurality of streams of fluid to impinge against a plurality of splash areas spaced over the surface of the product such that heat is transferred between each stream of fluid and the splash area against which it impinges and such that each stream is diffused transversely away from the stream to form a volume of spent fluid;

drawing each volume of spent fluid toward the stream of fluid that was diffused to form the spent volume, such that spent fluid from each of the plurality of streams does not influence the flow of fluid toward the product in any other stream;

collecting each volume of spent fluid adjacent the stream of fluid that was diffused to form the spent volume; and imparting relative movement between the product and the plurality of streams wherein the splash areas move across the surface of the product such that heat is transferred substantially uniformly over the surface of the product.

2. A method of transferring heat between a stream of temperature controlled fluid and a product in an impingement heat transfer device according to claim 1 wherein the steps of:

directing a plurality of streams of fluid to impinge against a plurality of splash areas spaced over the surface of the product such that heat is transferred between each stream of fluid and the splash area against which it impinges and such that each stream is diffused transversely away from the stream to form a volume of spent fluid; and drawing each volume of spent fluid transversely toward the stream of fluid that was diffused to form the spent volume such that spent fluid from each of the plurality of streams does not influence the flow of fluid toward the product in any other stream comprise the steps of:

providing an air supply duct and an air return duct having a partition wall wherein a tube has one end communicating with the inside of the air supply duct and another end extending through an opening in the air return duct, said opening in the air return duct having an inside diameter and said tube having an outside diameter, said outside diameter of the tube being less than said inside diameter of the opening in the air return duct to form an inlet into the air return duct encircling the tube; and circulating air to reduce pressure in the air return duct and increase pressure in the air supply duct such that a stream of air flows through and out of the tube and spent air is drawn through the opening encircling the tube into the air return duct.

3. A method of transferring heat between a stream of temperature controlled fluid and a product in an impingement heat transfer device, according to claim 1, the step of directing a plurality of streams of fluid to impinge against a plurality of splash areas spaced over the surface of the product comprising the steps of:

delivering temperature controlled fluid through each of a plurality of tubular passages having outlets formed to project a stream of fluid from each outlet.

4. A method of transferring heat between a stream of temperature controlled fluid and a product in an impingement heat transfer device, according to claim 3, the step of drawing each volume of spent fluid transversely toward the stream of fluid that was diffused to form the spent volume comprising the step of:

producing a plurality of areas of low pressure, at least one of said areas of low pressure being adjacent to and encircling each of the plurality of tubular passages and spaced from the outlets wherein spent fluid is drawn toward said areas of low pressure encircling the tubular passage after the stream impinges the product and before the spent fluid flows to influence the flow of fluid toward the product in any other stream.

5. A method of transferring heat between a stream of temperature controlled fluid and a product in an impingement heat transfer device, according to claim 4, the step of collecting each volume of spent fluid adjacent the stream of fluid that was diffused to form the spent volume further comprising the steps of:

forming a plurality of inlet openings having inside diameters in the wall of an air return duct;

positioning a tube having an outside diameter and having a tubular passage through each of said inlet openings in said air return duct, said OD of the tube being less than the ID of the inlet opening and said outlet being spaced from the wall of the air return duct; and maintaining pressure in the air return duct less than pressure outside the air return duct for producing areas of low pressure encircling each of the plurality of tubular passages and spaced from the outlets wherein spent fluid is drawn toward said inlet openings which encircle the tubular passage.

6. A method of transferring heat between a stream of temperature controlled fluid and a product in an impingement heat transfer device, according to claim 5, wherein the area of each spent air return inlet opening encircling the tube which is about $\frac{1}{4}(\pi)(ID)^2 - \frac{1}{4}(\pi)(OD)^2$ is greater than the area of the outlet which is about $\frac{1}{4}(\pi)(ID)^2$, where ID is the inside diameter of the inlet and OD is the outside diameter of the tube.

7. A method of transferring heat between a stream of temperature controlled fluid and a product in an impingement heat transfer device, according to claim 1, the step of imparting movement between the product and the plurality of streams such that the splash areas move across the surface of the product wherein heat is transferred substantially uniformly over the surface of the product comprising the step of: moving the product on a conveyor relative to the streams of fluid.

8. A method of transferring heat between a stream of temperature controlled fluid and a product in an impingement heat transfer device, according to claim 1, the step of imparting movement between the product and the plurality of streams such that the splash areas move across the surface of the product wherein heat is transferred substantially uniformly over the surface of the product comprising the step of: moving either one of the stream or the product relative to the other of the stream or the product.

9. A method of transferring heat between a stream of temperature controlled fluid and a product in an impingement heat transfer device, according to claim 1, with the addition of the step of moving the collected fluid adjacent a heat exchanger for controlling the temperature of the fluid.

10. An impingement heat transfer device for transferring heat between a stream of temperature controlled fluid and a product in comprising:
a cabinet:
means in said cabinet for directing a plurality of streams of fluid to impinge against a plurality of splash areas spaced over the surface of the product such that heat is transferred between each stream of fluid and the splash area against which it impinges and such that each stream is diffused transversely away from the stream to form a volume of spent fluid;
collector means in said cabinet for drawing each volume of spent fluid toward the stream of fluid that was diffused to form the spent volume, such that spent fluid from each of the plurality of streams does not influence the flow of fluid toward the product in any other stream and for collecting each volume of spent fluid adjacent the stream of fluid that was diffused to form the spent volume; and
means for imparting relative movement between the product and the plurality of streams wherein the splash areas move across the surface of the product such that heat is transferred substantially uniformly over the surface of the product.

11. An impingement heat transfer device for transferring heat between a stream of temperature controlled fluid and a product, according to claim 10, said means for directing a plurality of streams of fluid to impinge against a plurality of splash areas spaced over the surface of the product comprising: means for delivering temperature controlled fluid through each of a plurality of tubular passages having outlets formed to project a stream of fluid from each outlet.

12. An impingement heat transfer device for transferring heat between a stream of temperature controlled fluid and a product, according to claim 10, said collector means for drawing each volume of spent fluid transversely toward the stream of fluid that was diffused to form the spent volume comprising:
means for producing a plurality of areas of low pressure, at least one of said areas of low pressure being adjacent to and encircling each of the plurality of tubular passages and spaced from the outlets wherein spent fluid is drawn toward said areas of low pressure encircling the tubular passage after the stream impinges the product and before the spent fluid flows to influence the flow of fluid toward the product in any other stream.

13. An impingement heat transfer device for transferring heat between a stream of temperature controlled fluid and a product, according to claim 10, said collector means for drawing each volume of spent fluid transversely toward the stream of fluid that was diffused to form the spent volume such that spent fluid from each of the plurality of streams does not influence the flow of fluid toward the product in any other stream and for collecting each volume of spent fluid adjacent the stream of fluid that was diffused to form the spent volume comprising:
an air return duct having a wall having a plurality of inlet openings with inside diameters;
a tube having an outside diameter and having a tubular passage extending through each of said inlet openings in said air return duct, said OD of the tube being less than the ID of the inlet opening and said outlet being spaced from the wall of the air return duct; and
means for maintaining pressure in the air return duct less than pressure outside the air return duct for producing areas of low pressure encircling each of the plurality of tubular passages and spaced from the outlets wherein spent fluid is drawn toward said inlet openings which encircle the tubular passage.

14. An impingement heat transfer device for transferring heat between a stream of temperature controlled fluid and a product, according to claim 10, wherein said means for directing a plurality of streams of fluid to impinge against a plurality of splash areas comprises: means for imparting relative movement between the streams and the product such that the splash areas move across the surface of the product.

15. An impingement heat transfer device for transferring heat between a stream of temperature controlled fluid and a product, according to claim 10, said means for imparting relative movement between the product and the plurality of streams wherein the splash areas move across the surface of the product such that heat is transferred substantially uniformly over the surface of the product comprising: conveyor means for moving the product relative to the streams of fluid.

16. An impingement heat transfer device for transferring heat between a stream of temperature controlled fluid and a product, according to claim 10, with the addition of means for moving the collected fluid adjacent a heat exchanger for controlling the temperature of the fluid.

17. An impingement heat transfer device for transferring heat between a stream of temperature controlled fluid and a product in comprising:
a cabinet:
means in said cabinet for directing a plurality of streams of fluid to impinge against a plurality of splash areas spaced over the surface of the product such that heat is transferred between each stream of fluid and the splash area against which it impinges and such that each stream is diffused transversely away from the stream to form a volume of spent fluid;
collector means between adjacent streams for collecting spent fluid such that spent fluid from each of the plurality of streams does not influence the flow of fluid toward the product in any other stream and for collecting each volume of spent fluid adjacent the stream of fluid that was diffused to form the spent volume; and means for imparting relative movement between the product and the plurality of streams wherein the splash areas move across the surface of the product such that heat is transferred substantially uniformly over the surface of the product.

18. An impingement heat transfer device for transferring heat between a stream of temperature controlled fluid and a product, according to claim 17, said collector means between adjacent streams in said cabinet for collecting spent fluid comprising:

an air return duct having a wall having a plurality of inlet openings with inside diameters;

a tube having an outside diameter and having a tubular passage extending through each of said inlet openings in said air return duct, said OD of the tube being less than the ID of the inlet opening and said outlet being spaced from the wall of the air return duct; and means for maintaining pressure in the air return duct less than pressure outside the air return duct for producing areas of low pressure encircling each of the plurality of tubular passages and spaced from the outlets wherein spent fluid is drawn toward said inlet openings which encircle the tubular passage.

* * * * *

UNITED STATES PATENT AND TRADEMARK OFFICE
CERTIFICATE OF CORRECTION

PATENT NO.   : 6,049,066
DATED        : April 11, 2000
INVENTOR(S)  : W. Robert Wilson It is certified that error appears in the above-identified patent and that said Letters Patent is hereby corrected as shown below:

Claims 1-18 are deleted and replaced with the following Claims 1-18:

1. A method of transferring heat between a stream of temperature controlled fluid and a splash area on a product against which the stream impinges on the surface of the product in an impingement heat transfer device comprising the steps of:
    providing an air supply duct and an air return duct having a partition wall wherein a tube has one end communicating with the inside of the air supply duct and another end extending through an opening in the air return duct, said opening in the air return duct having an inside diameter and said tube having an outside diameter, said outside diameter of the tube being less than said inside diameter of the opening in the air return duct to form an inlet into the air return duct encircling the tube;
    circulating air to reduce pressure in the air return duct and increase pressure in the air supply duct such that a stream of air flows through and out of the tube and spent air is drawn through the opening encircling the tube into the air return duct;
    collecting each volume of spent fluid adjacent the stream of fluid that was diffused to form the spent volume; and
    imparting relative movement between the product and the stream wherein the splash area moves across the surface of the product such that heat is transferred substantially uniformly over the surface of the product.

2. A method of transferring heat between a stream of temperature controlled fluid and a product in an impingement heat transfer device according to Claim 1 wherein the steps of:
    directing a plurality of streams of fluid to impinge against a plurality of splash areas spaced over the surface of the product such that heat is transferred between each stream of fluid and the splash area against which it impinges and such that each stream is diffused transversely away from the stream to form a volume of spent fluid; and drawing each volume of spent fluid transversely toward the stream of fluid that was diffused to form the spent volume such that spent fluid from each of the plurality of streams does not influence the flow of fluid toward the product in any other stream.

3. A method of transferring heat between a stream of temperature controlled fluid and a product in an impingement heat transfer device, according to Claim 1, the

UNITED STATES PATENT AND TRADEMARK OFFICE
CERTIFICATE OF CORRECTION

PATENT NO. : 6,049,066
DATED : April 11, 2000
INVENTOR(S) : W. Robert Wilson

It is certified that error appears in the above-identified patent and that said Letters Patent is hereby corrected as shown below:

step of directing a plurality of streams of fluid to impinge against a plurality of splash areas spaced over the suface of the product comprising the steps of:
    delivering temperature controlled fluid through each of a plurality of tubular passages having outlets formed to project a stream of fluid from each outlet.

4. A method of transferring heat between a stream of temperature controlled fluid and a product in an impingement heat transfer device, according to Claim 3, the step of drawing each volume of spent fluid transversely toward the stream of fluid that was diffused to form the spent volume comprising the step of:
    producing a plurality of areas of low pressure, at least one of said areas of low pressure being adjacent to and encircling each of the plurality of tubular passages and spaced from the outlets wherein spent fluid is drawn toward said areas of low pressure encircling the tubular passage after the stream impinges the product and before the apent fluid flows to influence the flow of fluid toward the product in any other stream.

5. A method of transferring heat between a stream of temperature controlled fluid and a product in an impingement heat transfer device, according to Claim 4, the step of collecting each volume of spent fluid adjacent the stream of fluid that was diffused to form the spent volume further comprising the steps of:
    forming a plurality of inlet openings having inside diameters (ID) in the wall of an air return duct; positioning a tube having an outside diameter (OD) and having a tubular passage through each of said inlet openings in said air return duct, said OD of the tube being less than the ID of the inlet opening and said outlet being spaced from the wall of the air return duct; and
    maintaining pressure in the air return duct less than pressure outside the air return duct for producing areas of low pressure encircling each of the plurality of tubular passages and spaced form the outlets wherein spent fluid is drawn toward said inlet openings which encircle the tubular passage.

6. A method of transferring heat between a stream of temperature controlled fluid and a product in an impingement heat transfer device, according to Claim 5, wherein the area of each spent air return inlet opening encircling the tube which is about $1/4(\pi)(ID)^2 - 1/4(\pi)(OD)^2$ is greater than the area of the outlet which is about $1/4(\pi)(ID)^2$,

UNITED STATES PATENT AND TRADEMARK OFFICE
CERTIFICATE OF CORRECTION

PATENT NO.   : 6,049,066           Page 3 of 6
DATED        : April 11, 2000
INVENTOR(S)  : W. Robert Wilson It is certified that error appears in the above-identified patent and that said Letters Patent is hereby corrected as shown below:

where ID is the inside diameter of the inlet and OD is the outside diameter of the tube.

7. A method of transferring heat between a stream of temperature controlled fluid and a product in an impingement heat transfer device, according to Claim 1, the step of imparting movement between the product and the plurality of streams such that the splash areas moves across the surface of the product wherein heat is transferred substantially uniformly over the surface of the product comprising the step of: moving the product on a conveyor relative to the streams of fluid.

8. A method of transferring heat between a stream of temperature controlled fluid and a product in an impingement heat transfer device, according to Claim 1, the step of inparting movement between the product and the plurality of streams such that the splash areas move across the surface of the product wherein heat is transferred substantially uniformly over the surface of the product comprising the step of: moving either one of the stream or the product relative to the other of the stream or the product.

9. A method of transferring heat between a stream of temperature controlled fluid and a product in an impingement heat transfer device, according to Claim 1, with the addition of the step of moving the collected fluid adjacent a heat exchanger for controlling the temperature of the fluid.

10. An important heat transfer device for transferring heat between a stream of temperature controlled fluid and a product comprising:
a cabinet:
means in said cabinet for directing a plurality of streams of fluid to impinge against a plurality of splash areas spaced over the surface of the product such that heat is trasferred between each stream of fluid and the splash area against which it impinges and such that each stream is diffused transversely away from the stream to form a volumne of spent fluid;
an air return duct having a plurality of inlet openings with inside diameters (ID);
a tube having an outside diameter (OD)and having a tubular passage extending through each of said inlet openings in said air return duct, said OD of the tube being less

UNITED STATES PATENT AND TRADEMARK OFFICE
CERTIFICATE OF CORRECTION

PATENT NO.  : 6,049,066  
DATED       : April 11, 2000  
INVENTOR(S) : W. Robert Wilson Page 4 of 6

It is certified that error appears in the above-identified patent and that said Letters Patent is hereby corrected as shown below:

than the ID of the inlet opening and said outlet being spaced from the wal of the air return duct;

means for maintaining pressure in the air return duct less than pressure outside the air return duct for producing areas of low pressure encircling each of the plurality of tubular passages and spaced from the outlets wherein spent fluid is drawn toward said inlet openings which encircle the tubular passage; and means for imparting relative movement between the product and the plurality of streams wherein the splash areas move acroos the surface of the product such that heat is transferred substantially uniformly over the surface of the product.

11. An impingement heat transfer device for transferring heat between a stream of temperature controlled fluid and a product, according to Claim 10, said means for directing a plurality of streams of fluid to impinge against a plurality of splash areas spaced over the surface of the product comprising: means for delivering temperature controlled fluid through each of a plurality of tubular passages having outlets formed to project a stream of fluid from each outlet 12. An impingement heat transfer device for transferring heat between a stream of temperature controlled fluid and a product, according to Claim 10, said collector means for drawing each volume of spent fluid transversely toward the stream of fluid that was diffused to form the spent volume comprising:

means for producing a plurality of areas of low pressure, at least one of said areas of low pressure being adjacent to and encircling each of the plurality of tubular passages and spaced from the outlets wherein spent fluid is drawn toward said areas of low pressure encircling the tubular passage after the stream impinges the product and before the spent fluid flows to influence the flow of flow of fluid toward the product in any other stream.

13. An impingement heat transfer device for transferring heat between a stream of temperature controlled fluid and a product, accord to Claim 10, said collector means for drawing each volume of spent fluid transversely toward the stream of fluid that was diffused to form the spent volume such that spent fluid from each of the plurality of streams does not influence the flow of fluid toward the product in any other stream and

UNITED STATES PATENT AND TRADEMARK OFFICE
CERTIFICATE OF CORRECTION

PATENT NO.   : 6,049,066
DATED        : April 11, 2000
INVENTOR(S)  : W. Robert Wilson It is certified that error appears in the above-identified patent and that said Letters Patent is hereby corrected as shown below:

for collecting each volume of spent fluid adjacent the stream of fluid that was diffused to form the spent volume.

14. An impingment heat transfer device for transferring heat between a stream of temperature controlled fluid and a product, according to Claim 10, wherein said means for directing a plurality of streams of fluid to impinge against a plurality of splash areas comprises:
means for imparting relative movement between the streams and the product such that the splash areas move acroos the surface of the product.

15. An impingement heat transfer device for transferring heat between a stream of temperature controlled fluid and a product, according to Claim 10, said means for imparting relative movement between the product and the plurality of streams wherein the splash areas move across the surface of the product such that heat is transferred substantially uniformly over the surface of the surface of the product comprising: conveyor means for moving the product relavtive to the streams of fluid.

16. An impingement heat transfer device for transferring heat between a stream of temperature controlled fluid and a product, according to Claim 10, with the addition of means for moving the collected fluid adjacent a heat exchanger for controlling the temperature of the fluid.

17. An impingement heat transfer device for transferring heat between a stream of temperature controlled fluid and a product comprising:
a cabinet:
means in said cabinet for directing a plurality of streams of fluid to impinge against a plurality of splash areas spaced over the surfaceof the product such that heat is transferred between each stream of fluid and the splash area against which it impinges and such that each stream is diffused transversely away from the stream to form a volume of spent fluid;
collector means encircling each of said streams for collecting spent fluid such that spent fluid from each of the plurality of streams does not influence the flow

UNITED STATES PATENT AND TRADEMARK OFFICE
CERTIFICATE OF CORRECTION

PATENT NO. : 6,049,066
DATED : April 11, 2000
INVENTOR(S) : W. Robert Wilson

It is certified that error appears in the above-identified patent and that said Letters Patent is hereby corrected as shown below:

of fluid toward the product in any other stream and for collecting each volume of spent fluid adjacent the stream of fluid that was diffused to form the spent volume; and means for imparting relative movement between the product and the plurality of streams wherein the splash areas move across the surface of the product such that heat is transferred substantially uniformly over the surface of the product.

18. An impingement heat transfer device for transferring heat between a stream of temperature controlled fluid and a product, according to Claim 17, said collector means between adjacent streams in said cabinet for collecting spent fluid comprising:

an air return duct having a wall having a plurality of inlet openings with inside diameters;

a tube having an outside diameter and having a tubular passage extending through each of said inlet openings in said air return duct, said OD of the being less than the ID of the inlet opening and said outlet being spaced from the wall of air return duct; and means for maintaining pressure in the air return duct less than pressure outside the air return duct for producing areas of low pressure encircling each of the plurality of tubular passages and spaced from the outlets wherein spent fluid is drawn toward said inlet openings which encircle the tubular passage.

Signed and Sealed this

Nineteenth Day of June, 2001

*Attest:*

*Attesting Officer*

NICHOLAS P. GODICI
*Acting Director of the United States Patent and Trademark Office*